US010438563B2

(12) United States Patent
Feng et al.

(10) Patent No.: US 10,438,563 B2
(45) Date of Patent: Oct. 8, 2019

(54) IMAGE PROCESSING METHOD, IMAGE PROCESSING DEVICE, DISPLAY APPARATUS AND NON-VOLATILE COMPUTER READABLE STORAGE MEDIUM

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Xuehuan Feng, Beijing (CN); Min He, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/990,654

(22) Filed: May 27, 2018

(65) Prior Publication Data

US 2019/0164521 A1 May 30, 2019

(30) Foreign Application Priority Data

Nov. 27, 2017 (CN) .......................... 2017 1 1204525

(51) Int. Cl.
*G09G 5/10* (2006.01)
*G09G 5/36* (2006.01)
(Continued)

(52) U.S. Cl.
CPC ......... *G09G 5/10* (2013.01); *G09G 2320/066* (2013.01); *G09G 2320/0686* (2013.01); *G09G 2320/08* (2013.01)

(58) Field of Classification Search
CPC combination set(s) only.
See application file for complete search history.

(56) References Cited

U.S. PATENT DOCUMENTS

2005/0104842 A1* 5/2005 Baik ....................... G06T 5/008 345/102
2007/0091433 A1* 4/2007 Garner ..................... H04N 5/58 359/459
(Continued)

FOREIGN PATENT DOCUMENTS

CN 102458020 A 5/2012
CN 104347041 A 2/2015
(Continued)

OTHER PUBLICATIONS

First Chinese Office Action dated Mar. 26, 2019, received for corresponding Chinese Application No. 201711204525.7.

*Primary Examiner* — Wesner Sajous
(74) *Attorney, Agent, or Firm* — Kinney & Lange, P.A.

(57) ABSTRACT

An image processing method and an image processing device, a display apparatus, and a non-volatile computer readable storage medium are provided. The method includes acquiring a first region and a second region adjacent to each other and having a common boundary in an image, a first brightness value of the first region being larger than a second brightness value of the second region; determining one or more brightness transition regions in the first region and/or the second region and at a side close to the boundary; determining one or more transition brightness values being smaller than or equal to the first brightness value and larger than or equal to the second brightness value; and setting brightness of each brightness transition region to be a corresponding transition brightness value.

20 Claims, 7 Drawing Sheets

(51) Int. Cl.

| | |
|---|---|
| ***G09G 5/30*** | (2006.01) |
| ***H04N 5/57*** | (2006.01) |
| ***H04N 9/77*** | (2006.01) |

(56) References Cited

U.S. PATENT DOCUMENTS

| | | | | |
|---|---|---|---|---|
| 2012/0092384 | A1 | 4/2012 | Chang | |
| 2014/0055505 | A1 * | 2/2014 | Ikeda | G09G 3/22<br>345/690 |
| 2017/0061903 | A1 * | 3/2017 | Yata | G09G 3/3413 |
| 2018/0020142 | A1 * | 1/2018 | Park | H04N 5/23212 |
| 2018/0052108 | A1 * | 2/2018 | Sofue | G01N 21/64 |

FOREIGN PATENT DOCUMENTS

| | | | |
|---|---|---|---|
| CN | 105516614 | A | 4/2016 |
| CN | 107274819 | A | 10/2017 |

* cited by examiner

IMAGE PROCESSING METHOD, IMAGE PROCESSING DEVICE, DISPLAY APPARATUS AND NON-VOLATILE COMPUTER READABLE STORAGE MEDIUM

CROSS-REFERENCE TO RELATED APPLICATION

The present application claims a priority of Chinese patent application No. 201711204525.7 filed in China on Nov. 27, 2017, the disclosure of which is incorporated herein by reference in its entirety.

TECHNICAL FIELD

The present disclosure relates to a field of display technology, and in particular, to an image processing method, an image processing device, a display apparatus, and a non-volatile computer readable storage medium.

BACKGROUND

With development of display panels, an organic light emitting display (OLED) has become a development trend in the future display industry due to a high contrast and a low power consumption thereof.

In an OLED display technique, an image having one or more high-brightness regions is needed so as to increase a brightness contrast under a specific environment (such as in the sun). However, a sudden change of brightness occurs at a position where a high-brightness static image region and a low-brightness static image region borders with each other in a High Dynamic Range (HDR) image, thereby causing an abrupt experience to viewers and affecting a display effect of the images adversely.

SUMMARY

The present disclosure provides an image processing method and an image processing device, a display apparatus, and a non-volatile computer readable storage medium.

In a first aspect, some embodiments of the present disclosure provide an image processing method, and the method includes: acquiring a first region having a first brightness value and a second region having a second brightness value in an image to be processed, wherein the first brightness value of the first region is larger than the second brightness value of the second region, the first region is adjacent to the second region, and the first region and the second region have a common boundary; determining one or more brightness transition regions in at least one of the first region or the second region, wherein the one or more brightness transition regions are located in at least one of the first region or the second region and located at a side close to the boundary common to the first region and the second region; determining one or more transition brightness values according to the first brightness value of the first region and the second brightness value of the second region, wherein, the one or more transition brightness values are smaller than or equal to the first brightness value of the first region and larger than or equal to the second brightness value of the second region; and setting brightness of each of the one or more brightness transition regions to be a corresponding one of the one or more transition brightness values.

Optionally, the determining one or more brightness transition regions in at least one of the first region or the second region, includes: in the first region, sequentially determining the one or more brightness transition regions by taking the boundary common to the first region and the second region as a starting point and in a direction away from the boundary; or in the second region, sequentially determining the one or more brightness transition regions by taking the boundary common to the first region and the second region as the starting point and in a direction away from the boundary, wherein each of the one or more brightness transition regions includes at least one pixel.

Optionally, the determining one or more brightness transition regions in at least one of the first region or the second region, includes: in the first region, sequentially determining one or more first brightness transition regions by taking the boundary common to the first region and the second region as a starting point and in a direction away from the boundary, wherein each of the one or more first brightness transition regions includes at least one pixel; and in the second region, sequentially determining one or more second brightness transition regions by taking the boundary common to the first region and the second region as the starting point and in a direction away from the boundary, wherein each of the one or more second brightness transition regions includes at least one pixel.

Optionally, the determining one or more transition brightness values according to the first brightness value of the first region and the second brightness value of the second region, includes: in a case that the one or more brightness transition regions are determined in the first region, determining a corresponding transition brightness value for each of the one or more brightness transition regions, wherein with the first brightness value of the first region being a fiducial brightness value, a transition brightness value of each of the one or more brightness transition regions is lowered gradually as the brightness transition region is closer to the boundary, and one of the one or more brightness transition regions directly adjacent to the second region has a transition brightness larger than or equal to the second brightness value of the second region; or in a case that the one or more brightness transition regions are determined in the second region, determining a corresponding transition brightness value for each of the one or more brightness transition regions, wherein with the second brightness value of the second region being a fiducial brightness value, a transition brightness value of each of the one or more brightness transition regions is increased gradually as the brightness transition region is closer to the boundary, and one of the one or more brightness transition regions directly adjacent to the first region has a transition brightness value smaller than or equal to the first brightness value of the first region.

Optionally, the determining one or more transition brightness values according to the first brightness value of the first region and the second brightness value of the second region, includes: determining a corresponding transition brightness value for each of the one or more first brightness transition regions, wherein with the first brightness value of the first region being a fiducial brightness value, a transition brightness value of each of the one or more first brightness transition regions is lowered gradually as the first brightness transition region is closer to the boundary, and one of the one or more first brightness transition regions directly adjacent to the second region has a transition brightness value larger than or equal to a transition brightness value of one of the one or more second brightness transition regions directly adjacent to the first region in the second region; and determining a corresponding transition brightness value for each of the one or more second brightness transition regions, wherein with the second brightness value of the second region being a fiducial brightness value, a transition brightness value of each of the one or more second brightness transition regions is increased gradually as the second brightness transition region is closer to the boundary, and the one of the one or more second brightness transition regions directly adjacent to the first region has the transition brightness value smaller than or equal to the transition brightness value of the one of the one or more first brightness transition regions directly adjacent to the second region in the first region.

In a second aspect, some embodiments of the present disclosure provide an image processing device, and the device includes: an acquisition module configured to acquire a first region having a first brightness value and a second region having a second brightness value in an image to be processed, wherein the first brightness value of the first region is larger than the second brightness value of the second region, the first region is adjacent to the second region, and the first region and the second region have a common boundary; a transition region determination module configured to determine one or more brightness transition regions in at least one of the first region or the second region, wherein the one or more brightness transition regions are located in at least one of the first region or the second region and located at a side close to the boundary common to the first region and the second region; a brightness value determination module configured to determine one or more transition brightness values according to the first brightness value of the first region and the second brightness value of the second region, wherein the one or more transition brightness values are smaller than or equal to the first brightness value of the first region and larger than or equal to the second brightness value of the second region; and a brightness setting module configured to set brightness of each of the one or more brightness transition regions to be a corresponding one of the one or more transition brightness values.

Optionally, the transition region determination module includes: a first transition region determination submodule configured to, in the first region, sequentially determine the one or more brightness transition regions by taking the boundary common to the first region and the second region as a starting point and in a direction away from the boundary; or in the second region, sequentially determine the one or more brightness transition regions by taking the boundary common to the first region and the second region as the starting point and in a direction away from the boundary, wherein each of the one or more brightness transition regions includes at least one pixel.

Optionally, the transition region determination module includes: a second transition region determination submodule configured to, in the first region, sequentially determine one or more first brightness transition regions by taking the boundary common to the first region and the second region as a starting point and in a direction away from the boundary, wherein each of the one or more first brightness transition regions includes at least one pixel; and a third transition region determination submodule configured to, in the second region, sequentially determining one or more second brightness transition regions by taking the boundary common to the first region and the second region as a starting point and in a direction away from the boundary, wherein each of the one or more second brightness transition regions includes at least one pixel.

The brightness value determination module further includes: a first brightness value determination submodule, configured to in a case that the one or more brightness transition regions are determined in the first region, determine a corresponding transition brightness value for each of the one or more brightness transition regions, wherein with the first brightness value of the first region being a fiducial brightness value, a transition brightness value of each of the one or more brightness transition regions is lowered gradually as the brightness transition region is closer to the boundary, and one of the one or more brightness transition regions directly adjacent to the second region has a transition brightness value larger than or equal to the second brightness value of the second region; or a second brightness value determination submodule, configured to in a case that the one or more brightness transition regions are determined in the second region, determining a corresponding transition brightness value for each of the one or more brightness transition regions, wherein with the second brightness value of the second region being a fiducial brightness value, a transition brightness value of each of the one or more brightness transition regions is increased gradually as the brightness transition region is closer to the boundary, and one of the one or more brightness transition regions directly adjacent to the first region has a transition brightness value smaller than or equal to the first brightness value of the first region.

The brightness value determination module further includes: a third brightness value determination submodule, configured to determine a corresponding transition brightness value for each of the one or more first brightness transition regions, wherein with the first brightness value of the first region being a fiducial brightness value, a transition brightness value of each of the one or more first brightness transition regions is lowered gradually as the first brightness transition region is closer to the boundary, and one of the one or more first brightness transition regions directly adjacent to the second region has a transition brightness value larger than or equal to a transition brightness value of one of the one or more second brightness transition regions directly adjacent to the first region in the second region; and a fourth brightness value determination submodule, configured to determine a corresponding transition brightness value for each of the one or more second brightness transition regions, wherein with the second brightness value of the second region being a fiducial brightness value, a transition brightness value of each of the one or more second brightness transition regions is increased gradually as the second brightness transition region is closer to the boundary, and the one of the one or more second brightness transition regions directly adjacent to the first region has the transition brightness value smaller than or equal to the transition brightness value of the one of the one or more first brightness transition regions directly adjacent to the second region in the first region.

In a third aspect, some embodiments of the present disclosure provide a display apparatus, and the apparatus includes the image processing device according to the second aspect.

In a fourth aspect, some embodiments of the present disclosure provide a display apparatus, the apparatus includes a processor, and a storage including computer programs stored on the storage and executable by the processor, wherein in a case that the computer programs are executed by the processor, the processor implements the steps in the method according to the first aspect.

In a fifth aspect, some embodiments of the present disclosure provide a non-volatile computer readable storage medium which includes computer programs stored on the non-volatile computer readable storage medium, wherein in a case that the computer programs are executed by a computer processor, the computer processor implements the steps in the method according to the first aspect.

DETAILED DESCRIPTION

Detailed description of the present disclosure will be given hereinafter in conjunction with drawings and the embodiments of the present disclosure. The following embodiments are used to illustrate the present disclosure only, but do not limit the scope of the present disclosure.

Figure 1:
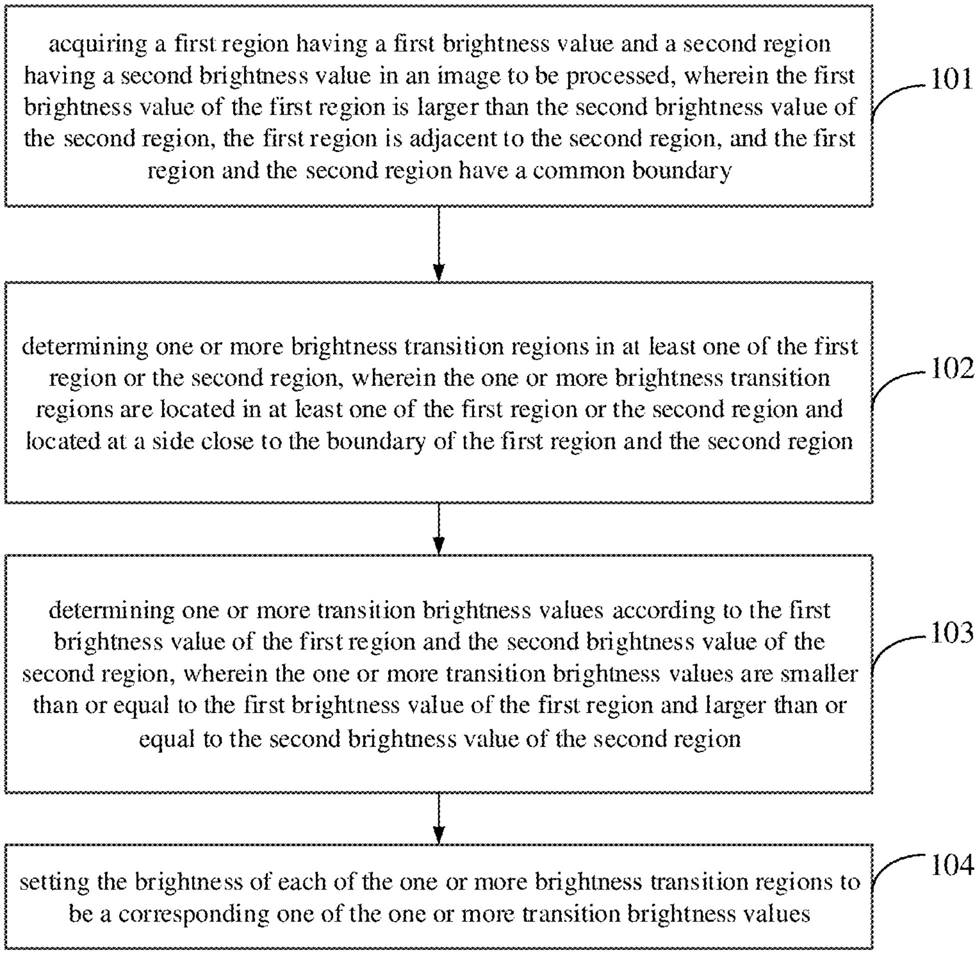
FIG. 1 is a flowchart of an image processing method in some embodiments of the present disclosure.

As shown in FIG. 1, some embodiments of the present disclosure provide an image processing method, and the image processing method includes steps 101-104.

Step 101: acquiring a first region having a first brightness value and a second region having a second brightness value in an image to be processed, wherein the first brightness value of the first region is larger than the second brightness value of the second region, the first region is adjacent to the second region, and the first region and the second region have a common boundary.

Since input signals for a panel are different, an image displayed in the panel often has different display regions having different brightness levels. The display regions of different brightness levels may have arbitrary shapes such as rectangular shapes or circular shapes. Therefore, in some embodiments of the present disclosure, two regions having different brightness levels, being adjacent to each other, and having a common boundary i.e., the first region and the second region may be acquired in the image currently being displayed on the panel. The first brightness value of the first region is larger than the second brightness value of the second region. The image being displayed and to be processed is a static image.

Step 102, determining one or more brightness transition regions in at least one of the first region or the second region, wherein the one or more brightness transition regions are located in at least one of the first region or the second region and located at a side close to the boundary of the first region and the second region. In some embodiments of the present disclosure, the one or more brightness transition regions may be determined in either one or both of the first region and the second region.

As an example, in the first region, one or more brightness transition regions are sequentially determined by taking the boundary common to the first region and the second region as a starting point and in a direction away from the boundary; or in the second region, one or more brightness transition regions are sequentially determined by taking the boundary common to the first region and the second region as the starting point and in a direction away from the boundary, wherein each of the one or more brightness transition regions includes at least one pixel.

As another example, in the first region, one or more first brightness transition regions are sequentially determined by taking the boundary common to the first region and the second region as a starting point and in a direction away from the boundary, wherein each of the one or more first brightness transition regions includes at least one pixel; and in the second region, one or more second brightness transition regions are sequentially determined by taking the boundary common to the first region and the second region as the starting point and in a direction away from the boundary, wherein each of the one or more second brightness transition regions includes at least one pixel.

Step 103, determining one or more transition brightness values according to the first brightness value of the first region and the second brightness value of the second region, wherein the one or more transition brightness values are smaller than or equal to the first brightness value of the first region and larger than or equal to the second brightness value of the second region.

In this step, in a case that the one or more brightness transition regions are determined in the first region or in the second region, a corresponding transition brightness value is determined for each of the one or more brightness transition regions when the one or more brightness transition regions are determined in the first region, wherein with the first brightness value of the first region being a fiducial brightness value, a transition brightness value of each of the one or more brightness transition regions is lowered gradually as the brightness transition region is closer to the boundary, and one of the one or more brightness transition regions directly adjacent to the second region has a transition brightness value larger than or equal to the second brightness value of the second region. When the one or more brightness transition regions are determined in the second region, a corresponding transition brightness value is determined for each of the one or more brightness transition regions, wherein with the second brightness value of the second region being a fiducial brightness value, a transition brightness value of each of the one or more brightness transition regions is increased gradually as the brightness transition region is closer to the boundary, and one of the one or more brightness transition regions directly adjacent to the first region has a transition brightness value smaller than or equal to the first brightness value of the first region.

In this step, in a case that the one or more brightness transition regions are determined in both the first region and the second region, a corresponding transition brightness value is determined for each of the one or more first brightness transition regions in the first region, wherein with the first brightness value of the first region being a fiducial brightness value, a transition brightness value of each of the one or more first brightness transition regions is lowered gradually as the first brightness transition region is closer to the boundary, and one of the one or more first brightness transition regions directly adjacent to the second region has a transition brightness value larger than or equal to a transition brightness value of one of the one or more second brightness transition regions directly adjacent to the first region in the second region; and a corresponding transition brightness value is determined for each of the one or more second brightness transition regions, wherein with the second brightness value of the second region being a fiducial brightness value, a transition brightness value of each of the one or more second brightness transition regions is increased gradually as the second brightness transition region is closer to the boundary, and one of the one or more second brightness transition regions directly adjacent to the first region has the transition brightness value smaller than or equal to the transition brightness value of the one of the one or more first brightness transition regions directly adjacent to the second region.

Step 104, setting the brightness of each of the one or more brightness transition regions to be a corresponding one of the one or more transition brightness values.

In some embodiments of the present disclosure, the one or more brightness transition regions may be determined in either or both of the first region and the second region in the image to be processed, and the transition brightness values of the one or more brightness transition regions are between the first brightness value of the first region and the second brightness value of the second region. Therefore, brightness transition between the first region and the second region in the image to be processed is smoother, and a display effect of the image is increased.

Figure 2:
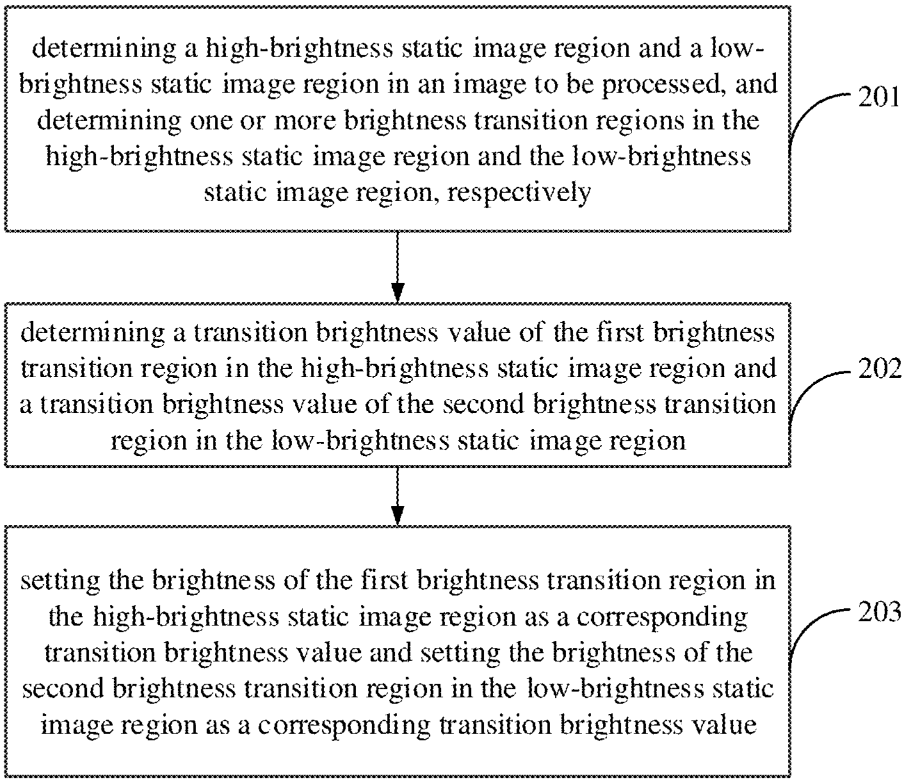
FIG. 2 is a flowchart of an image processing method in some embodiments of the present disclosure.

As shown in FIG. 2, some embodiments of the present disclosure provide an image processing method, and the image processing method includes steps 201-203.

Step 201: determining a high-brightness static image region and a low-brightness static image region in an image to be processed, and determining one or more brightness transition regions in the high-brightness static image region and the low-brightness static image region, respectively.

In the related art, a conceivable sudden change of brightness (larger than 400 nits) generally exists at a boundary common to the high-brightness static image region and the low-brightness static image region. This sudden change of brightness may generate an image having a bright part and a dark part that are obvious to human eyes, thereby affecting the display effect. Furthermore, human eyes are very sensitive to sudden change of brightness larger than 400 nits. Therefore, in some embodiments of the present disclosure, a smooth processing is performed on brightness of the first region and brightness of the second region.

In an actual application, the high-brightness static image region and the low-brightness static image region displayed in the panel are generated by different signals. Therefore, the two regions may be obtained. The high-brightness static image region may be a rectangular region, or a region having any other shape, such as a circular region, a triangular region, an elliptical region, or the like.

Generally, difference between the brightness of the high-brightness static image region and the brightness of the low-brightness static image region is large. For example, the brightness of the high-brightness static image region may be equal to or larger than 600 nits, and the brightness of the low-brightness static image region may be equal to or smaller than 150 nits.

Figure 3:
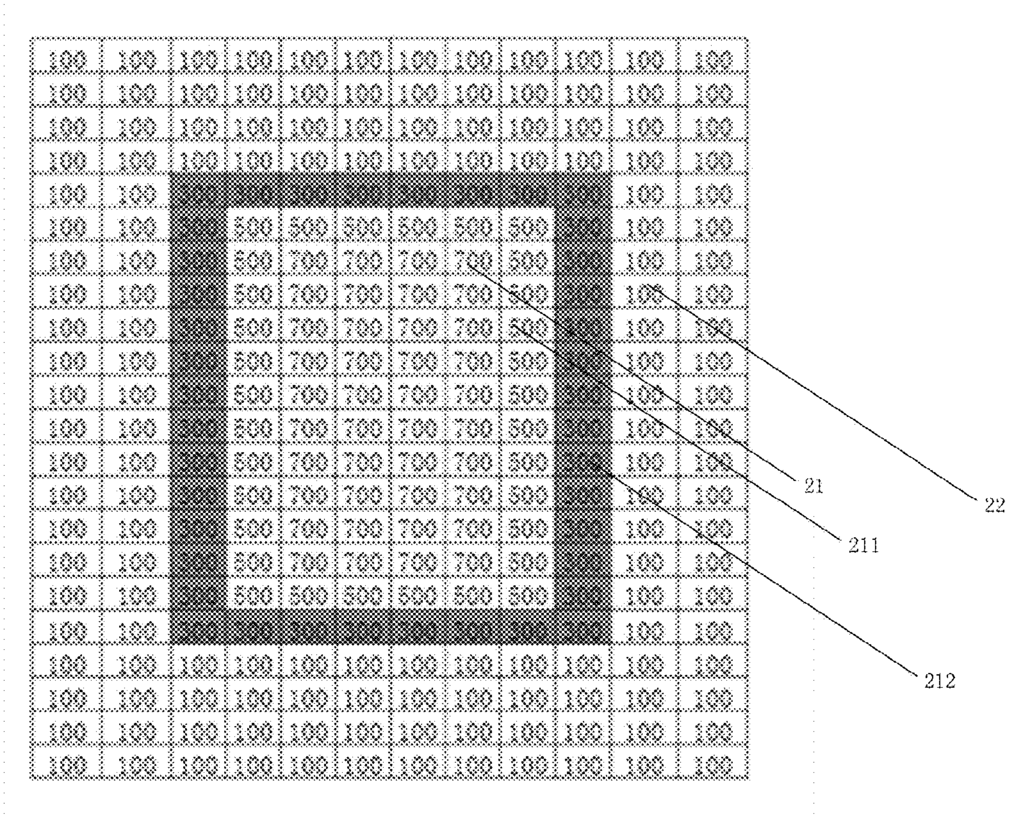
FIG. 3 is a schematic diagram of a high-brightness static image region and a low-brightness static image region in some embodiments of the present disclosure.

As an example, in some embodiments of the present disclosure, as shown in FIG. 3, a high-brightness static image region 21 (a region formed of pixels having brightness of 500 nits and pixels having brightness of 700 nits, and brightness values of the high-brightness static image region shown in FIG. 3 are values having been adjusted according to some embodiments of the present disclosure) and a low-brightness static image region 22 (a region formed of pixels having brightness of 100 nits and pixels having brightness of 300 nits, and the brightness values of the low-brightness static image region shown in FIG. 3 are values having been adjusted according to some embodiments of the present disclosure) are rectangular regions, and have brightness of 700 nits and brightness of 100 nits, respectively, and brightness difference between the high-brightness static image region and the low-brightness static image region is 600 nits. In this example, one or more brightness transition regions are determined in the high-brightness static image region and one or more brightness transition regions are determined in the low-brightness static image region.

A region 211 in the high-brightness static image region is taken as a first brightness transition region, and a region 212 in the low-brightness static image region is taken as a second brightness transition region.

Step 202: determining a transition brightness value of the first brightness transition region in the high-brightness static image region and a transition brightness value of the second brightness transition region in the low-brightness static image region.

In this example, the brightness difference of 600 nits is equally divided into three parts, and each part is 200 nits. A region directly adjacent to the boundary of the high-brightness static image region and including two pixels in a direction perpendicular to the boundary is selected as the first brightness transition region 211, and 500 nits (700 nits-200 nits) is determined as the brightness of the first brightness transition region 211; and a region directly adjacent to the boundary of the low-brightness static image and including two pixels in a direction perpendicular to the boundary is selected as the second brightness transition region 212, and 300 nits (100 nits+200 nits) is determined as the brightness of the second brightness transition region 212.

Step 203: setting the brightness of the first brightness transition region in the high-brightness static image region as a corresponding transition brightness value and setting the brightness of the second brightness transition region in the low-brightness static image region as a corresponding transition brightness value.

In this manner, before the image is processed according to the method of the present disclosure, the sudden change of brightness from the brightness of the low-brightness static image region and the brightness of the high-brightness static image region is 700 nits-100 nits; and after the image is processed according to the method of the present disclosure, the sudden change of brightness is 700 nits-500 nits-3000 nits-100 nits. In this way, uncomfortable experience generated by the sudden change of brightness to human eyes may be alleviated effectively, and a residual image at the boundary of the high-brightness static image region and the low-brightness static image region may be reduced.

Figure 4:
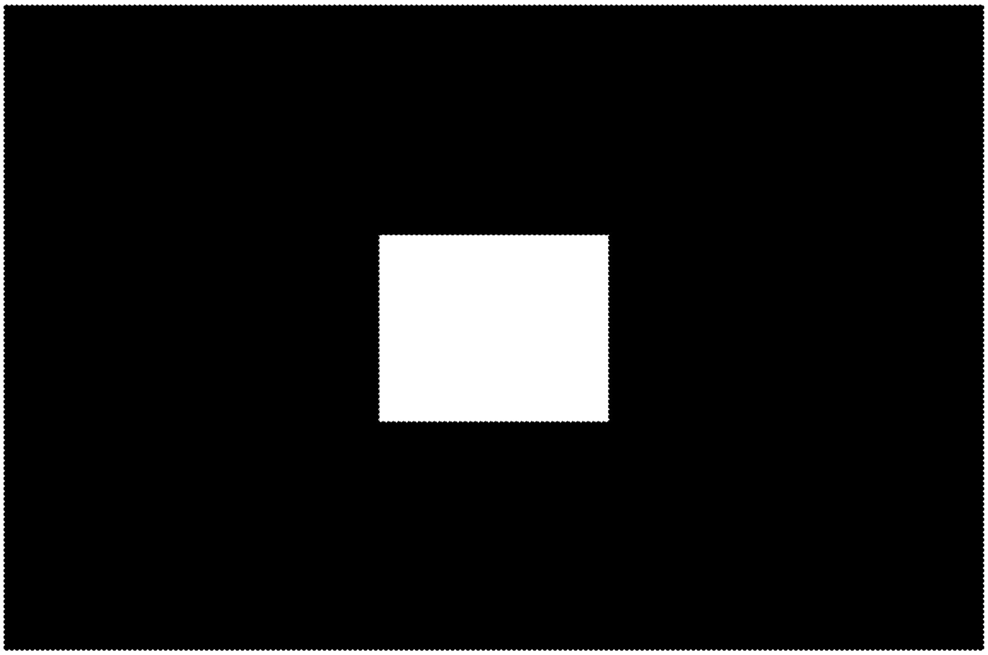
FIG. 4 is a schematic diagram of a residual-image test of a high-brightness static image region in some embodiments of the present disclosure.
Figure 5:
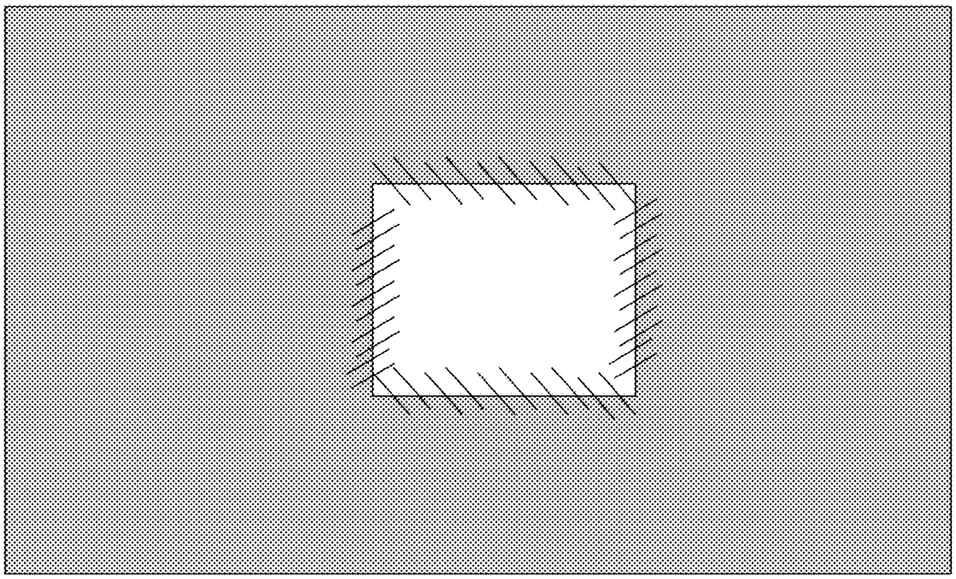
FIG. 5 is a boundary of a high-brightness static image region after the high-brightness static image region is processed according to some embodiments of the present disclosure.

Since the residual image is generated by hysteresis of a thin film transistor (TFT), i.e., severity of the residual image is determined by an offset degree of a threshold voltage of the TFT. The higher the offset degree of the threshold voltage of the TFT is, the more severe the residual image is. With the brightness of the panel increasing, a gate-source voltage of the TFT needed for driving a pixel is larger, and thus the offset degree of the threshold voltage of the TFT is higher, and the residual image is more severe, as shown in FIG. 4. The present disclosure makes brightness transition in an image smoother, i.e., gradually lowers the brightness of the high-brightness static image region to the brightness of the low-brightness static image region such that the severe residual image that may be seen clearly at the boundary of the high-brightness static image region before applying the method of the present disclosure becomes less apparent and the boundary is less distinct, as shown in FIG. 5.

Figure 6:
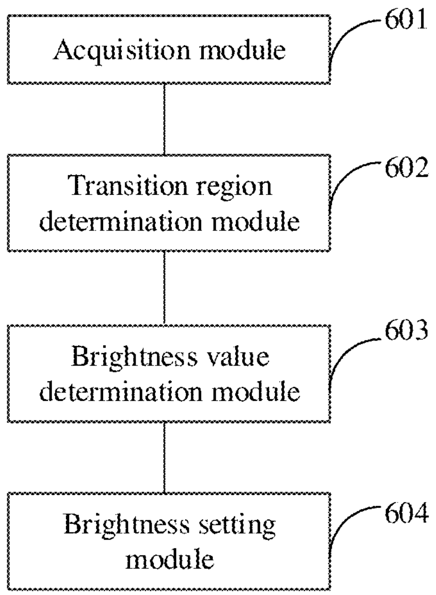
FIG. 6 is a structural schematic diagram of an image processing device in some embodiments of the present disclosure.

As shown in FIG. 6, some embodiments of the present disclosure provide an image processing device, and the device includes: an acquisition module 601 configured to acquire a first region having a first brightness value and a second region having a second brightness value in an image to be processed, wherein the first brightness value of the first region is larger than the second brightness value of the second region, the first region is adjacent to the second region, and the first region and the second region have a common boundary; a transition region determination module 602 configured to determine one or more brightness transition regions in at least one of the first region or the second region, wherein the one or more brightness transition regions are located in at least one of the first region or the second region and located at a side close to the boundary common to the first region and the second region; a brightness value determination module 603 configured to determine one or more transition brightness values according to the first brightness value of the first region and the second brightness value of the second region, wherein the one or more transition brightness values are smaller than or equal to the first brightness value of the first region and larger than or equal to the second brightness value of the second region; and a brightness setting module 604 configured to set the brightness of each of the one or more brightness transition regions to be a corresponding one of the one or more transition brightness values.

Figure 7:
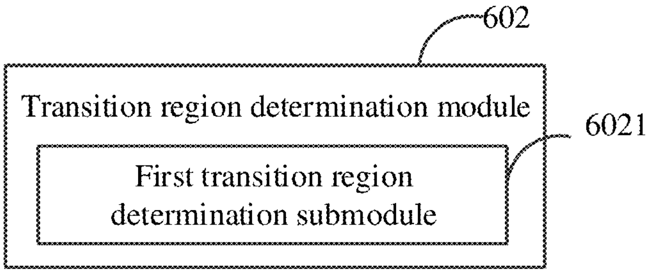
FIG. 7 is a structural schematic diagram of a transition region determination module in some embodiments of the present disclosure.

Optionally, as shown in FIG. 7, the transition region determination module 602 includes: a first transition region determination submodule 6021 configured to, in the first region, sequentially determine one or more brightness transition regions by taking the boundary common to the first region and the second region as a starting point and in a direction away from the boundary; or in the second region, sequentially determine one or more brightness transition regions by taking the boundary common to the first region and the second region as the starting point and in a direction away from the boundary, wherein each of the one or more brightness transition regions includes at least one pixel.

Figure 8:
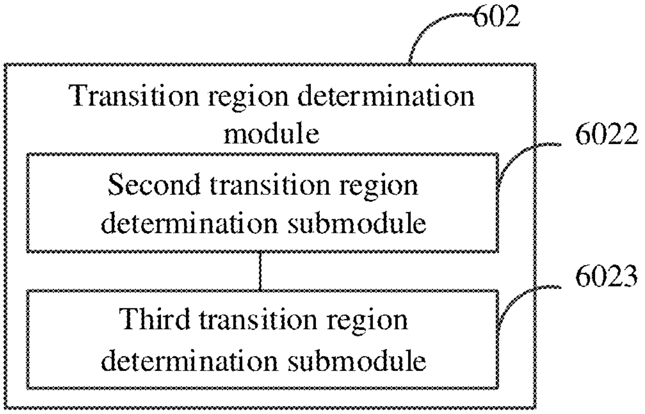
FIG. 8 is another structural schematic diagram of a transition region determination module in some embodiments of the present disclosure.

Optionally, as shown in FIG. 8, the transition region determination module 602 includes: a second transition region determination submodule 6022 configured to, in the first region, sequentially determine one or more first brightness transition regions by taking the boundary common to the first region and the second region as a starting point and in a direction away from the boundary, wherein each of the one or more first brightness transition regions includes at least one pixel; and a third transition region determination submodule 6023 configured to, in the second region, sequentially determine one or more second brightness transition regions by taking the boundary common to the first region and the second region as the starting point and in a direction away from the boundary, wherein each of the one or more second brightness transition regions includes at least one pixel.

Figure 9:
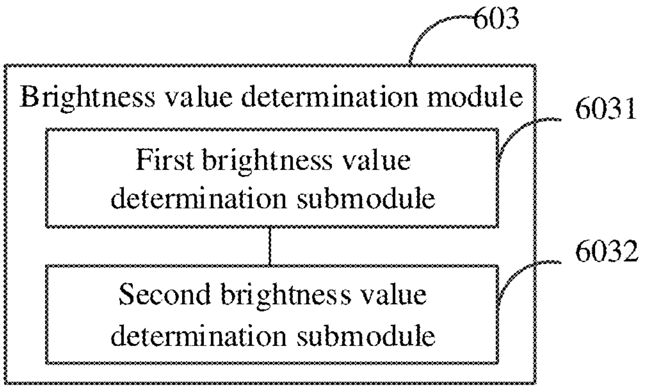
FIG. 9 is a structural schematic diagram of a brightness value determination module in some embodiments of the present disclosure.

Optionally, as shown in FIG. 9, the brightness value determination module 603 includes: a first brightness value determination submodule 6031, configured to in a case that the one or more brightness transition regions are determined in the first region, determine a corresponding transition brightness value for each of the one or more brightness transition regions, wherein with the first brightness value of the first region being a fiducial brightness value, a transition brightness value of each of the one or more brightness transition regions is lowered gradually as the brightness transition region is closer to the boundary, and one of the one or more brightness transition regions directly adjacent to the second region has a transition brightness value larger than or equal to the second brightness value of the second region; or a second brightness value determination submodule 6032, configured to in a case that the one or more brightness transition regions are determined in the second region, determine a corresponding transition brightness value for each of the one or more brightness transition regions, wherein with the second brightness value of the second region being a fiducial brightness value, a transition brightness value of each of the one or more brightness transition regions is increased gradually as the brightness transition region is closer to the boundary, and one of the one or more brightness transition regions directly adjacent to the first region has a transition brightness value smaller than or equal to the first brightness value of the first region.

Figure 10:
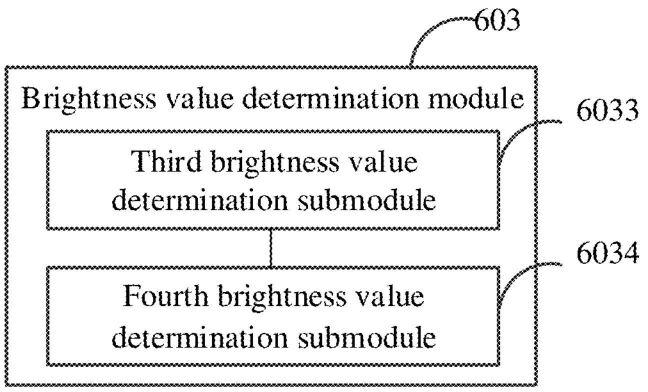
FIG. 10 is another structural schematic diagram of a brightness value determination module in some embodiments of the present disclosure.

Optionally, as shown in FIG. 10, the brightness value determination module 603 includes: a third brightness value determination submodule 6033, configured to determine a corresponding transition brightness value for each of the one or more first brightness transition regions, wherein with the first brightness value of the first region being a fiducial brightness value, a transition brightness value of each of the one or more first brightness transition regions is lowered gradually as the first brightness transition region is closer to the boundary, and one of the one or more first brightness transition regions directly adjacent to the second region has a transition brightness value larger than or equal to a transition brightness value of one of the one or more second brightness transition regions directly adjacent to the first region in the second region; and a fourth brightness value determination submodule 6034, configured to determine a corresponding transition brightness value for each of the one or more second brightness transition regions, wherein with the second brightness value of the second region being a fiducial brightness value, a transition brightness value of each of the one or more second brightness transition regions is increased gradually as the brightness transition region is closer to the boundary, and one of the one or more second brightness transition regions directly adjacent to the first region has a transition brightness value smaller than or equal to a brightness transition value of one of the one or more first brightness transition regions directly adjacent to the second region in the first region.

In some embodiments of the present disclosure, the one or more brightness transition regions may be determined in either or both of the first region and the second region in the image to be processed, and the transition brightness values of the one or more brightness transition regions are between the first brightness value of the first region and the second brightness value of the second region. Therefore, a sudden change of brightness between the first region and the second region in the image to be processed is smoother, and a display effect of the image is increased.

Some embodiments of the present disclosure provide a display apparatus, and the apparatus includes the image processing device shown in any one of FIG. 6 to FIG. 10.

Figure 11:
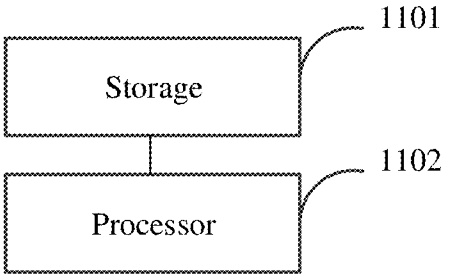
FIG. 11 is a structural schematic diagram of a display apparatus in some embodiments of the present disclosure.

As shown in FIG. 11, some embodiments of the present disclosure provide a display apparatus, the apparatus includes a processor 1102, and a storage 1101 including computer programs stored on the storage and executable by the processor 1102, wherein in a case that the computer programs are executed by the processor 1102, the processor 1102 implements the steps as follow: acquiring a first region having a first brightness value and a second region having a second brightness value in an image to be processed, wherein the first brightness value of the first region is larger than the second brightness value of the second region, the first region is adjacent to the second region, and the first region and the second region have a common boundary; determining one or more brightness transition regions in at least one of the first region or the second region, wherein the one or more brightness transition regions are located in at least one of the first region or the second region and located at a side close to the boundary common to the first region and the second region; determining one or more transition brightness values according to the first brightness value of the first region and the second brightness value of the second region, wherein the one or more transition brightness values are smaller than or equal to the first brightness value of the first region and larger than or equal to the second brightness value of the second region; and setting the brightness of each of the one or more brightness transition regions to be a corresponding one of the one or more transition brightness values.

In a case that the computer programs are executed by the processor 1102, the processor 1102 further performs the following steps: in the first region, sequentially determining one or more brightness transition regions by taking the boundary common to the first region and the second region as a starting point and in a direction away from the boundary; or in the second region, sequentially determining one or more brightness transition regions by taking the boundary common to the first region and the second region as the starting point and in a direction away from the boundary, wherein each of the one or more brightness transition regions includes at least one pixel.

In a case that the computer programs are executed by the processor 1102, the processor 1102 performs the following steps: in the first region, sequentially determining one or more first brightness transition regions by taking the boundary common to the first region and the second region as a starting point and in a direction away from the boundary, wherein each of the one or more first brightness transition regions includes at least one pixel; and in the second region, sequentially determining one or more second brightness transition regions by taking the boundary common to the first region and the second region as the starting point and in a direction away from the boundary, wherein each of the one or more second brightness transition regions includes at least one pixel.

In a case that the computer programs are executed by the processor 1102, the processor 1102 further performs the following steps: in a case that the one or more brightness transition regions are determined in the first region, determining a corresponding transition brightness value for each of the one or more brightness transition regions, wherein with the first brightness value of the first region being a fiducial brightness value, a transition brightness value of each of the one or more brightness transition regions is lowered gradually as the brightness transition region is closer to the boundary, and one of the one or more brightness transition regions directly adjacent to the second region has a transition brightness value larger than or equal to the second brightness value of the second region; or in a case that the one or more brightness transition regions are determined in the second region, determining a corresponding transition brightness value for each of the one or more brightness transition regions, wherein with the second brightness value of the second region being a fiducial brightness value, a transition brightness value of each of the one or more brightness transition regions is increased gradually as the brightness transition region is closer to the boundary, and one of the one or more brightness transition regions directly adjacent to the first region has a transition brightness value smaller than or equal to the first brightness value of the first region.

In a case that the computer programs are executed by the processor 1102, the processor 1102 further performs the following steps: determining a corresponding transition brightness value for each of the one or more first brightness transition regions, wherein with the first brightness value of the first region being a fiducial brightness value, a transition brightness value of each of the one or more first brightness transition regions is lowered gradually as the first brightness transition region is closer to the boundary, and one of the one or more first brightness transition regions directly adjacent to the second region has a transition brightness value larger than or equal to a transition brightness value of one of the one or more second brightness transition regions directly adjacent to the first region; and determining a corresponding transition brightness value for each of the one or more second brightness transition regions, wherein with the second brightness value of the second region being a fiducial brightness value, a transition brightness value of each of the one or more second brightness transition regions is increased gradually as the second brightness transition region is closer to the boundary, and one of the one or more second brightness transition regions directly adjacent to the first region has a transition brightness value smaller than or equal to the transition brightness value of one of the one or more first brightness transition regions directly adjacent to the second region.

Some embodiments of the present disclosure provide a non-volatile computer readable storage medium which includes computer programs stored on the non-volatile computer readable storage medium, wherein in a case that the computer programs are executed by a computer processor, the computer processor implements the steps as follow: acquiring a first region having a first brightness value and a second region having a second brightness value in an image to be processed, wherein the first brightness value of the first region is larger than the second brightness value of the second region, the first region is adjacent to the second region, and the first region and the second region have a common boundary; determining one or more brightness transition regions in at least one of the first region or the second region, wherein the one or more brightness transition regions are located in at least one of the first region or the second region and located at a side close to the boundary common to the first region and the second region; determining one or more transition brightness values according to the first brightness value of the first region and the second brightness value of the second region, wherein the one or more transition brightness values are smaller than or equal to the first brightness value of the first region and larger than or equal to the second brightness value of the second region; and setting brightness of each of the one or more brightness transition regions to be a corresponding one of the one or more transition brightness values.

The determining one or more brightness transition regions in at least one of the first region or the second region, includes: in the first region, sequentially determining one or more brightness transition regions by taking the boundary common to the first region and the second region as a starting point and in a direction away from the boundary; or in the second region, sequentially determining one or more brightness transition regions by taking the boundary common to the first region and the second region as the starting point and in a direction away from the boundary, wherein each of the one or more brightness transition regions includes at least one pixel.

The determining one or more brightness transition regions in at least one of the first region or the second region, includes: in the first region, sequentially determining one or more first brightness transition regions by taking the boundary common to the first region and the second region as a starting point and in a direction away from the boundary, wherein each of the one or more first brightness transition regions includes at least one pixel; and in the second region, sequentially determining one or more second brightness transition regions by taking the boundary common to the first region and the second region as the starting point and in a direction away from the boundary, wherein each of the one or more second brightness transition regions includes at least one pixel.

The determining one or more transition brightness values according to the first brightness value of the first region and the second brightness value of the second region, includes: in a case that the one or more brightness transition regions are determined in the first region, determining a corresponding transition brightness value for each of the one or more brightness transition regions, wherein with the first brightness value of the first region being a fiducial brightness value, a transition brightness value of each of the one or more brightness transition regions is lowered gradually as the brightness transition region is closer to the boundary, and one of the one or more brightness transition regions directly adjacent to the second region has a transition brightness larger than or equal to the second brightness value of the second region; or in a case that the one or more brightness transition regions are determined in the second region, determining a corresponding transition brightness value for each of the one or more brightness transition regions, wherein with the second brightness value of the second region being a fiducial brightness value, a transition brightness value of each of the one or more brightness transition regions is increased gradually as the brightness transition region is closer to the boundary, and one of the one or more brightness transition regions directly adjacent to the first region has a transition brightness value smaller than or equal to the first brightness value of the first region.

The determining one or more transition brightness values according to the first brightness value of the first region and the second brightness value of the second region, includes: determining a corresponding transition brightness value for each of the one or more first brightness transition regions, wherein with the first brightness value of the first region being a fiducial brightness value, a transition brightness value of each of the one or more first brightness transition regions is lowered gradually as the first brightness transition region is closer to the boundary, and one of the one or more first brightness transition regions directly adjacent to the second region has a transition brightness value larger than or equal to a transition brightness value of one of the one or more second brightness transition regions directly adjacent to the first region in the second region; and determining a corresponding transition brightness value for each of the one or more second brightness transition regions, wherein with the second brightness value of the second region being a fiducial brightness value, a transition brightness value of each of the one or more second brightness transition regions is increased gradually as the second brightness transition region is closer to the boundary, and one of the one or more second brightness transition regions directly adjacent to the first region has a transition brightness value smaller than or equal to the transition brightness value of one of the one or more first brightness transition regions directly adjacent to the second region in the first region.

It may be understood by one of ordinary skills in the art, modules or steps described in the present disclosure may be implemented by electronic circuits, computer software or a combination of the computer software and the electronic circuits. Whether the implementation is through the electronic circuits or through the computer software is determined by a specific application scenario and design constraints of technical solutions. Those skilled in the art may use different methods to implement the described modules or steps according to the specific application scenario, and such implementation does not go beyond the scope of the present disclosure.

Modules or submodules described as separated parts may be integral or physically separated, and parts displayed as modules may be or may not be physical units, may be located in a same place or be dispersed at multiple places. Some or all of the modules described above may be used to implement the technical solution of the present disclosure according to actual requirements. The modules described in some embodiments of the present disclosure may be integrated in one module or may be separated physically, or two or more of the modules may be integrated in one module.

The above described embodiments of the present disclosure are optional embodiments. It should be noted that numerous modification and embellishment may be made by one of ordinary skills in the art without departing from the spirit of the present disclosure, and such modification and embellishment also fall within the scope of the present disclosure.

What is claimed is:

1. An image processing method, comprising:

acquiring a first region having a first brightness value and a second region having a second brightness value in an image to be processed, wherein the first brightness value of the first region is larger than the second brightness value of the second region, the first region is adjacent to the second region, and the first region and the second region have a common boundary;

determining one or more brightness transition regions in at least one of the first region and the second region, wherein the one or more brightness transition regions are located in at least one of the first region and the second region, and are located at a side close to the boundary common to the first region and the second region;

determining one or more transition brightness values according to the first brightness value of the first region and the second brightness value of the second region, wherein the one or more transition brightness values are smaller than or equal to the first brightness value of the first region and larger than or equal to the second brightness value of the second region; and setting a brightness of each of the one or more brightness transition regions to be a corresponding one of the one or more transition brightness values.

2. The method according to claim 1, wherein determining one or more brightness transition regions in at least one of the first region and the second region comprises:

in the first region, sequentially determining the one or more brightness transition regions by taking the boundary common to the first region and the second region as a starting point and working in a direction away from the boundary; or in the second region, sequentially determining the one or more brightness transition regions by taking the boundary common to the first region and the second region as the starting point and working in a direction away from the boundary, wherein each of the one or more brightness transition regions comprises at least one pixel.

3. The method according to claim 1, wherein determining one or more brightness transition regions in at least one of the first region and the second region comprises:

in the first region, sequentially determining one or more first brightness transition regions by taking the boundary common to the first region and the second region as a starting point and working in a direction away from the boundary, wherein each of the one or more first brightness transition regions comprises at least one pixel; and in the second region, sequentially determining one or more second brightness transition regions by taking the boundary common to the first region and the second region as the starting point and working in a direction away from the boundary, wherein each of the one or more second brightness transition regions comprises at least one pixel.

4. The method according to claim 2, wherein determining one or more transition brightness values according to the first brightness value of the first region and the second brightness value of the second region comprises:

where the one or more brightness transition regions are determined in the first region, determining a corresponding transition brightness value for each of the one or more brightness transition regions, wherein with the first brightness value of the first region being a fiducial brightness value, a transition brightness value of each of the one or more brightness transition regions is lowered gradually as the brightness transition region becomes closer to the boundary, and one of the one or more brightness transition regions directly adjacent to the second region has a transition brightness value larger than or equal to the second brightness value of the second region; or where the one or more brightness transition regions are determined in the second region, determining a corresponding transition brightness for each of the one or more brightness transition regions, wherein with the second brightness value of the second region being a fiducial brightness value, a transition brightness value of each of the one or more brightness transition regions is increased gradually as the brightness transition region becomes closer to the boundary, and one of the one or more brightness transition regions directly adjacent to the first region has a transition brightness value smaller than or equal to the first brightness value of the first region.

5. The method according to claim 3, wherein determining one or more transition brightness values according to the first brightness value of the first region and the second brightness value of the second region comprises:

determining a corresponding transition brightness value for each of the one or more first brightness transition regions, wherein with the first brightness value of the first region being a fiducial brightness value, the transition brightness value of each of the one or more first brightness transition regions is lowered gradually as the first brightness transition region becomes closer to the boundary, and one of the one or more first brightness transition regions directly adjacent to the second region has a transition brightness value larger than or equal to the transition brightness value of one of the one or more second brightness transition regions directly adjacent to the first region in the second region; and determining a corresponding transition brightness value for each of the one or more second brightness transition regions, wherein with the second brightness value of the second region being a fiducial brightness value, the transition brightness value of each of the one or more second brightness transition regions is increased gradually as the second brightness transition region becomes closer to the boundary, and one of the one or more second brightness transition regions directly adjacent to the first region has a transition brightness value smaller than or equal to the transition brightness value of the one of the one or more first brightness transition regions directly adjacent to the second region in the first region.

6. An image processing device, comprising:

an acquisition module configured to acquire a first region having a first brightness value and a second region having a second brightness value in an image to be processed, wherein the first brightness value of the first region is larger than the second brightness value of the second region, the first region is adjacent to the second region, and the first region and the second region have a common boundary;

a transition region determination module configured to determine one or more brightness transition regions in at least one of the first region or the second region, wherein the one or more brightness transition regions are located in at least one of the first region or the second region and located at a side close to the boundary common to the first region and the second region;

a brightness value determination module configured to determine one or more transition brightness values according to the first brightness value of the first region and the second brightness value of the second region, wherein the one or more transition brightness values are smaller than or equal to the first brightness value of the first region and larger than or equal to the second brightness value of the second region; and a brightness setting module configured to set brightness of each of the one or more brightness transition regions to be a corresponding one of the one or more transition brightness values.

7. The device according to claim 6, wherein the transition region determination module comprises:

a first transition region determination submodule configured to, in the first region, sequentially determine the one or more brightness transition regions by taking the boundary common to the first region and the second region as a starting point and working in a direction away from the boundary; or in the second region, sequentially determine the one or more brightness transition regions by taking the boundary common to the first region and the second region as the starting point and working in a direction away from the boundary, wherein each of the one or more brightness transition regions comprises at least one pixel.

8. The device according to claim 6, wherein the transition region determination module comprises:

a second transition region determination submodule configured to, in the first region, sequentially determine one or more first brightness transition regions by taking the boundary common to the first region and the second region as a starting point and working in a direction away from the boundary, wherein each of the one or more first brightness transition regions comprises at least one pixel; and a third transition region determination submodule configured to, in the second region, sequentially determine one or more second brightness transition regions by taking the boundary common to the first region and the second region as a starting point and working in a direction away from the boundary, wherein each of the one or more second brightness transition regions comprises at least one pixel.

9. The device according to claim 7, wherein the brightness value determination module further comprises:

a first brightness value determination submodule, configured to, where the one or more brightness transition regions are determined in the first region, determine a corresponding transition brightness value for each of the one or more brightness transition regions, wherein with the first brightness value of the first region being a fiducial brightness value, a transition brightness value of each of the one or more brightness transition regions is lowered gradually as the brightness transition region is closer to the boundary, and one of the one or more brightness transition regions directly adjacent to the second region has a transition brightness value larger than or equal to the second brightness value of the second region; or a second brightness value determination submodule, configured to, where the one or more brightness transition regions are determined in the second region, determine a corresponding transition brightness value for each of the one or more brightness transition regions, wherein with the second brightness value of the second region being a fiducial brightness value, a transition brightness value of each of the one or more brightness transition regions is increased gradually as the brightness transition region is closer to the boundary, and one of the one or more brightness transition regions directly adjacent to the first region has a transition brightness value smaller than or equal to the first brightness value of the first region.

10. The device according to claim 8, wherein the brightness value determination module further comprises:

a third brightness value determination submodule, configured to determine a corresponding transition brightness value for each of the one or more first brightness transition regions, wherein with the first brightness value of the first region being a fiducial brightness value, the transition brightness value of each of the one or more first brightness transition regions is lowered gradually as the first brightness transition region becomes closer to the boundary, and one of the one or more first brightness transition regions directly adjacent to the second region has a transition brightness value larger than or equal to the transition brightness value of one of the one or more second brightness transition regions directly adjacent to the first region in the second region; and a fourth brightness value determination submodule, configured to determine a corresponding transition brightness value for each of the one or more second brightness transition regions, wherein with the second brightness value of the second region being a fiducial brightness value, the transition brightness value of each of the one or more second brightness transition regions is increased gradually as the second brightness transition region becomes closer to the boundary, and the one of the one or more second brightness transition regions directly adjacent to the first region has a transition brightness value smaller than or equal to the transition brightness value of the one of the one or more first brightness transition regions directly adjacent to the second region in the first region.

11. A display apparatus, comprising:

the image processing device according to claim 6.

12. A display apparatus, comprising:

the image processing device according to claim 7.

13. A display apparatus, comprising:

the image processing device according to claim 8.

14. A display apparatus, comprising:

a processor, and a storage comprising computer programs stored on the storage and executable by the processor, wherein the computer programs are executable by the processor to implement the steps in the method according to claim 1.

15. A display apparatus, comprising:

a processor, and a storage comprising computer programs stored on the storage and executable by the processor, wherein the computer programs are executable by the processor to implement the steps in the method according to claim 2.

16. A display apparatus, comprising:

a processor, and a storage comprising computer programs stored on the storage and executable by the processor, wherein the computer programs are executable by the processor to implement the steps in the method according to claim 3.

17. A display apparatus, comprising:

a processor, and a storage comprising computer programs stored on the storage and executable by the processor, wherein the computer programs are executable by the processor to implement the steps in the method according to claim 4.

18. A display apparatus, comprising:

a processor, and a storage comprising computer programs stored on the storage and executable by the processor, wherein the computer programs are executable by the processor to implement the steps in the method according to claim 5.

19. A non-volatile computer readable storage medium, comprising:

computer programs stored on the non-volatile computer readable storage medium, wherein the computer programs are executable by a computer processor to implement the steps in the method according to claim 1.

20. A non-volatile computer readable storage medium, comprising:

computer programs stored on the non-volatile computer readable storage medium, wherein the computer programs are executable by a computer processor to implement the steps in the method according to claim 2.

* * * * *